(12) United States Patent
Howell et al.

(10) Patent No.: US 9,400,053 B2
(45) Date of Patent: *Jul. 26, 2016

(54) MECHANICAL SEAL WITH PFA BELLOWS

(71) Applicant: GE Oil & Gas ESP, Inc., Oklahoma City, OK (US)

(72) Inventors: Steven Alan Howell, Oklahoma City, OK (US); Brian Reeves, Edmond, OK (US); Chengbao Wang, Oklahoma City, OK (US); Charles Collins, Oklahoma City, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/569,884

(22) Filed: Dec. 15, 2014

(65) Prior Publication Data

US 2015/0098843 A1   Apr. 9, 2015

Related U.S. Application Data

(63) Continuation of application No. 13/687,895, filed on Nov. 28, 2012, now Pat. No. 8,925,928.

(51) Int. Cl.

| | |
|---|---|
| *F16J 15/34* | (2006.01) |
| *F16J 15/36* | (2006.01) |
| *F04B 39/00* | (2006.01) |
| *E21B 43/12* | (2006.01) |
| *F04D 29/12* | (2006.01) |
| *F04D 13/10* | (2006.01) |

(52) U.S. Cl.
CPC ............... *F16J 15/36* (2013.01); *E21B 43/12* (2013.01); *E21B 43/128* (2013.01); *F04B 39/00* (2013.01); *F04D 13/10* (2013.01); *F04D 29/126* (2013.01)

(58) Field of Classification Search
CPC ........ F16J 15/344; F16J 15/36; F04D 29/126; F04B 39/00; E21B 43/128
See application file for complete search history.

(56) References Cited

U.S. PATENT DOCUMENTS

| | | | | |
|---|---|---|---|---|
| 4,095,808 | A * | 6/1978 | Glasson | 277/372 |
| 4,342,538 | A * | 8/1982 | Wolford et al. | 415/231 |
| 4,380,416 | A * | 4/1983 | Menager | 415/174.3 |
| 6,113,106 | A * | 9/2000 | Dahlheimer | 277/433 |
| 6,338,489 | B1 * | 1/2002 | Nakano | 277/385 |
| 2003/0151208 | A1 * | 8/2003 | Riedl et al. | 277/370 |

* cited by examiner

*Primary Examiner* — Gilbert Lee
(74) *Attorney, Agent, or Firm* — Crowe & Dunlevy, P.C.

(57) ABSTRACT

A mechanical seal has a stationary face and rotating assembly adjacent to the stationary face. The rotating assembly includes an upper bellows ring, a lower bellows ring and a runner between the lower bellows ring and the stationary face. A bellows extends between the upper bellows ring and the lower bellows ring. In preferred embodiments, the bellows is constructed from a perfluoroalkoxy polymer and is secured within the upper bellows ring and the lower bellows ring by a selected locking mechanism. The locking mechanism may include the use of crimp rings configured for a press fit engagement within the upper and lower bellows rings. Alternatively, the locking mechanism may employ locking rings configured for threaded engagement with the upper and lower bellows rings.

20 Claims, 7 Drawing Sheets

MECHANICAL SEAL WITH PFA BELLOWS

RELATED APPLICATIONS

This application is a continuation of U.S. patent application Ser. No. 13/687,895, entitled Mechanical Seal with PFA Bellows, filed Nov. 28, 2012, the disclosure of which is herein incorporated by reference.

FIELD OF THE INVENTION

This invention relates generally to the field of submersible pumping systems, and more particularly, but not by way of limitation, to a mechanical seal for use with a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Other components commonly used include seal sections and gearboxes. Each of the components and sub-components in a submersible pumping system must be engineered to withstand the inhospitable downhole environment, which includes wide ranges of temperature, pressure and corrosive well fluids.

For prolonged operation in the downhole environment, it is necessary to seal various internal components of the pumping system from corrosive well fluids and debris. Although there are a variety of components within the pumping system that are susceptible to unwanted fluid migration, moving parts, such as rotating shafts, are particularly difficult to seal. To prevent fluid leaks around rotating shafts, designers often employ mechanical seals that fit around the outer circumference of a cylindrical shaft.

As shown in FIG. 1, Prior Art mechanical seal designs may include bellows 10, a coiled spring 12, a runner 14 and a stationary ring 16. These components cooperate to prevent the migration of fluid along a centralized shaft 18. The stationary ring 16 has an internal diameter sized to permit the free rotation of the shaft 18. In contrast, the elastomer bellows 10, springs 12 and runner 14 rotate with the shaft 18. The rotating runner 14 is held in place against the stationary face 16 by the spring-loaded bellows 10. The bellows 10 typically has a fold that allows its length to adjust to keep the runner 14 in contact with the stationary face 16 if the shaft should experience axial displacement. In the past, the bellows 10 has been manufactured from elastomers or thin, corrugated metal.

Limitations in presently available designs, however, can result in failures in the mechanical seal that allow well fluids to penetrate undesirable locations and to require costly repairs. After prolonged exposure to repetitive axial movement and elevated temperatures, the elastomer bellows 10 may degrade or slip from its intended position, thereby compromising the ability of the runner 14 to create a positive seal against the stationary face 16. It is to these and other deficiencies and requirements in the prior art that the present invention is directed.

SUMMARY OF THE INVENTION

In a preferred embodiment, the present invention includes a mechanical seal that has a stationary face and rotating assembly adjacent to the stationary face. The rotating assembly includes an upper bellows ring, a lower bellows ring and a runner between the lower bellows ring and the stationary face. A bellows extends between the upper bellows ring and the lower bellows ring. In preferred embodiments, the bellows is constructed from a perfluoroalkoxy polymer and is secured within the upper bellows ring and the lower bellows ring by a selected locking mechanism. The locking mechanism may include the use of crimp rings configured for a press fit engagement within the upper and lower bellows rings. Alternatively, the locking mechanism may employ locking rings configured for threaded engagement with the upper and lower bellows rings.

DETAILED DESCRIPTION OF THE PREFERRED EMBODIMENTS

Figure 2:
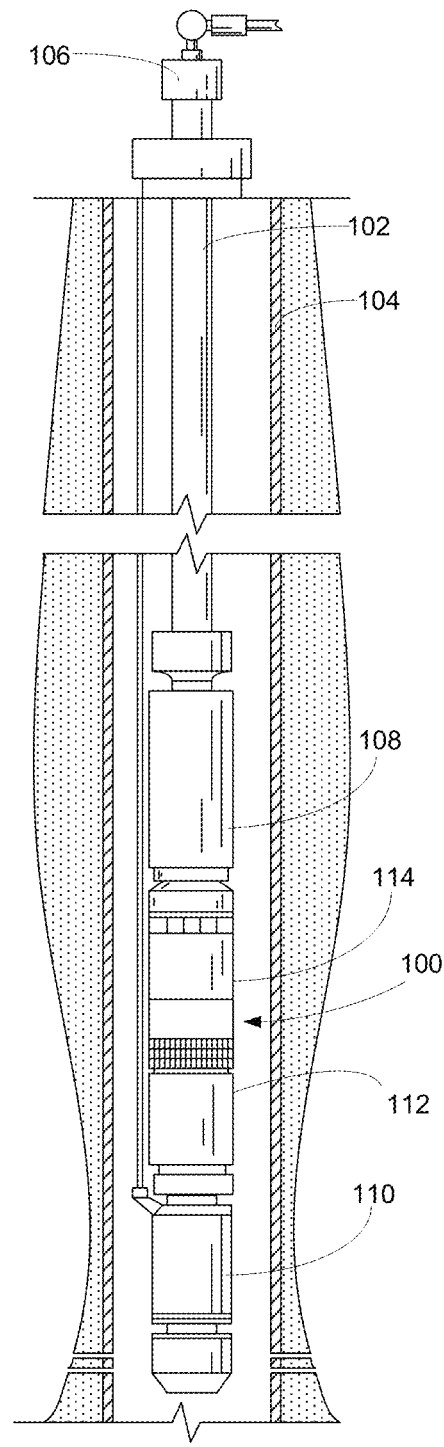
FIG. 2 is an elevational view of a submersible pumping system constructed in accordance with a presently preferred embodiment.

In accordance with a preferred embodiment of the present invention, FIG. 2 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump assembly 108, a motor assembly 110 and a seal section 112. The motor assembly 110 is preferably an electrical motor that receives power from a surface-mounted motor control unit (not shown). When energized, the motor assembly 110 drives a shaft linkage that causes the pump assembly 108 to operate. The seal section 112 shields the motor assembly 110 from mechanical thrust produced by the pump assembly 108 and provides for the expansion of motor lubricants during operation. The seal section 112 also isolates the motor assembly 110 from the wellbore fluids passing through the pump assembly 108. Although only one of each component is shown, it will be understood that more can be connected when appropriate. For example, in many applications, it is desirable to use tandem-motor combinations, multiple gas separators, multiple seal sections and multiple pump assemblies.

Figure 3:
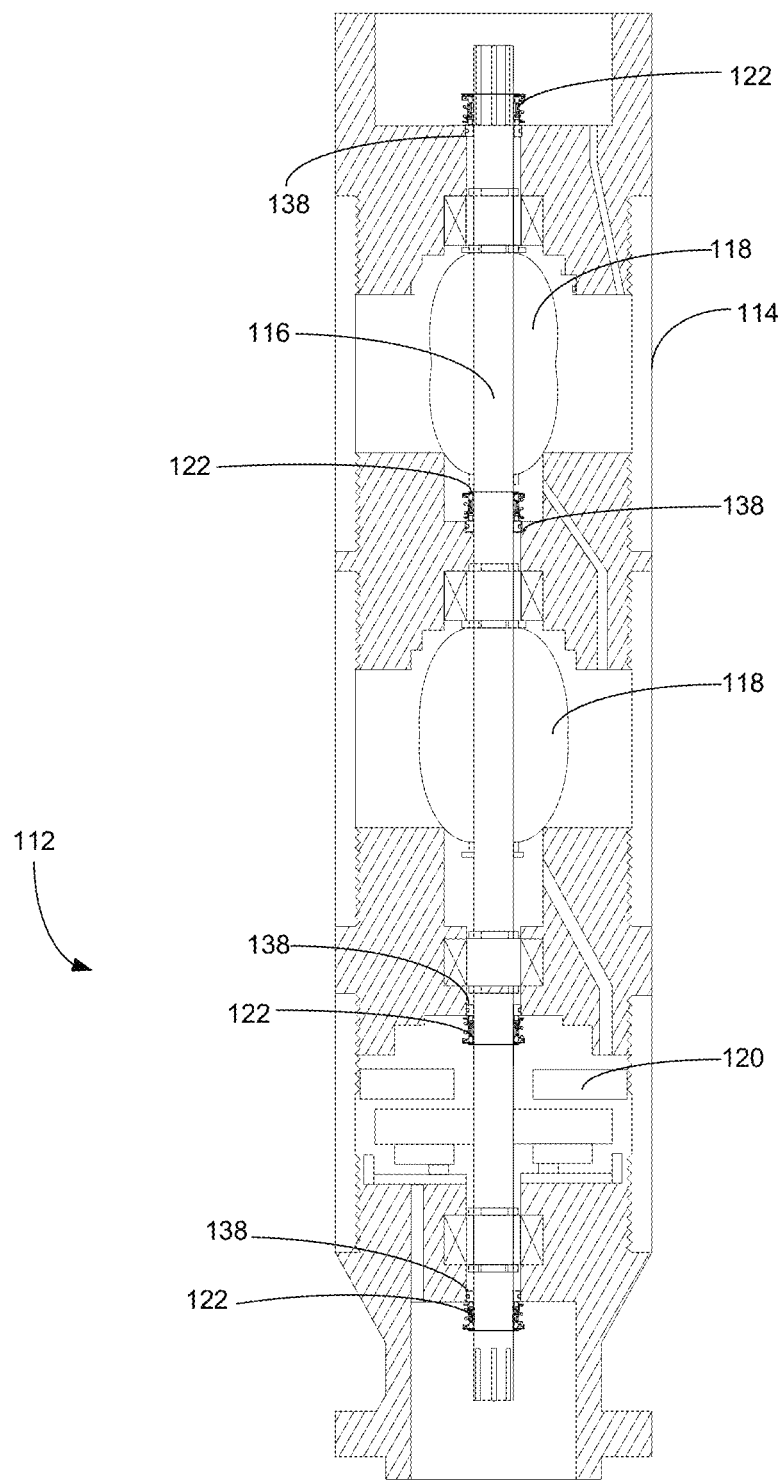
FIG. 3 is a cross-sectional view of a seal section for use with the submersible pumping system of FIG. 1.

Referring now to FIG. 3, shown therein is a cross-sectional view of the seal section 112. The seal section 112 includes a housing 114, a shaft 116, a plurality of elastomer bags 118 and thrust bearings 120. The elastomer bags 118 are configured to prevent the contamination of clean motor lubricants with wellbore fluids. The shaft 116 transfers mechanical energy from the motor assembly 110 to the pump assembly 108. The thrust bearings 120 are designed to limit the amount of axial displacement realized by the shaft 116 during operation. The seal section 112 also includes one or more mechanical seals 122. The mechanical seals 122 are located at various positions within the seal section 112 and limit the migration of fluid along the shaft 116.

Figure 1:
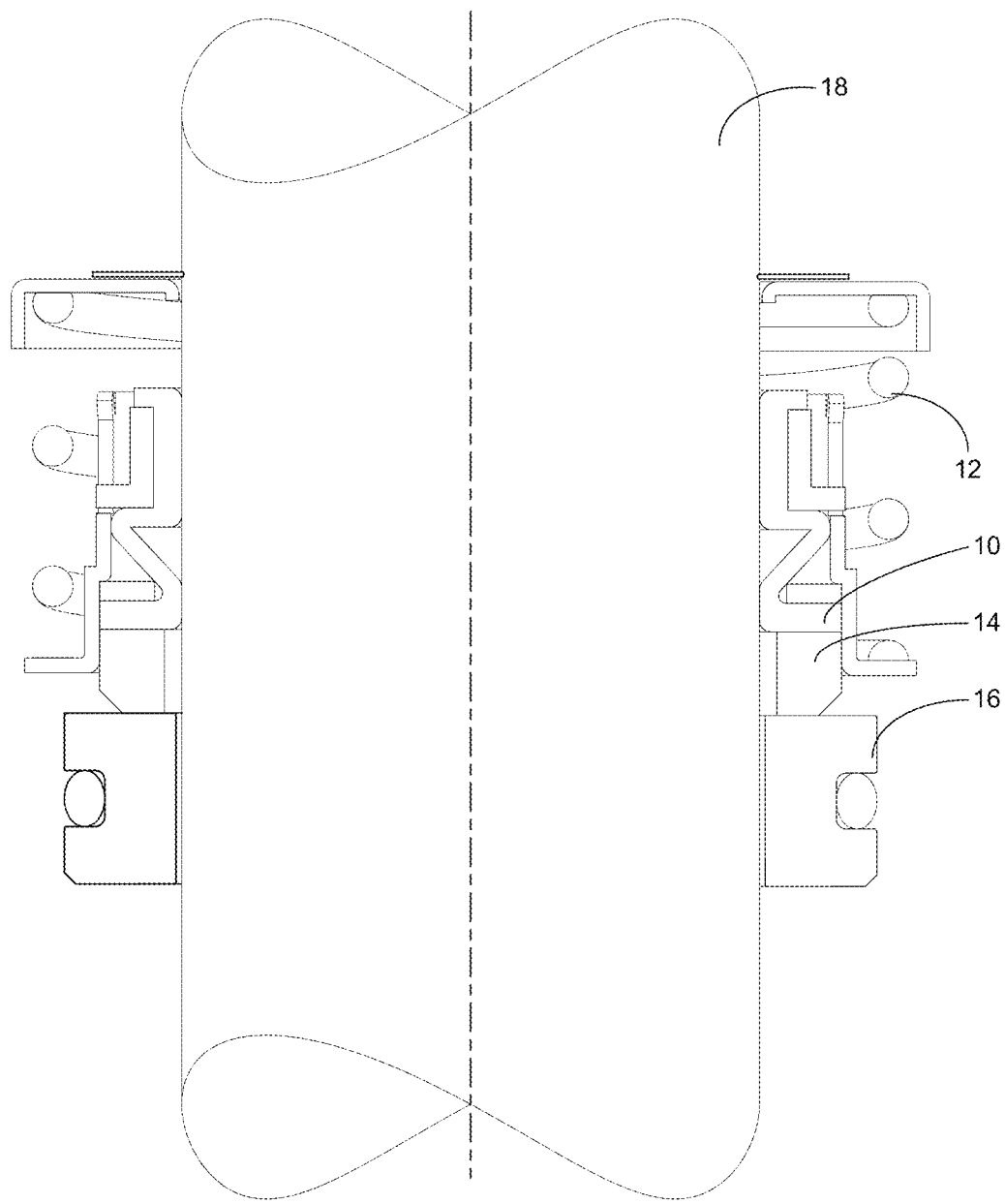
FIG. 1 is a partial cross-sectional view of a PRIOR ART mechanical seal.
Figure 4:
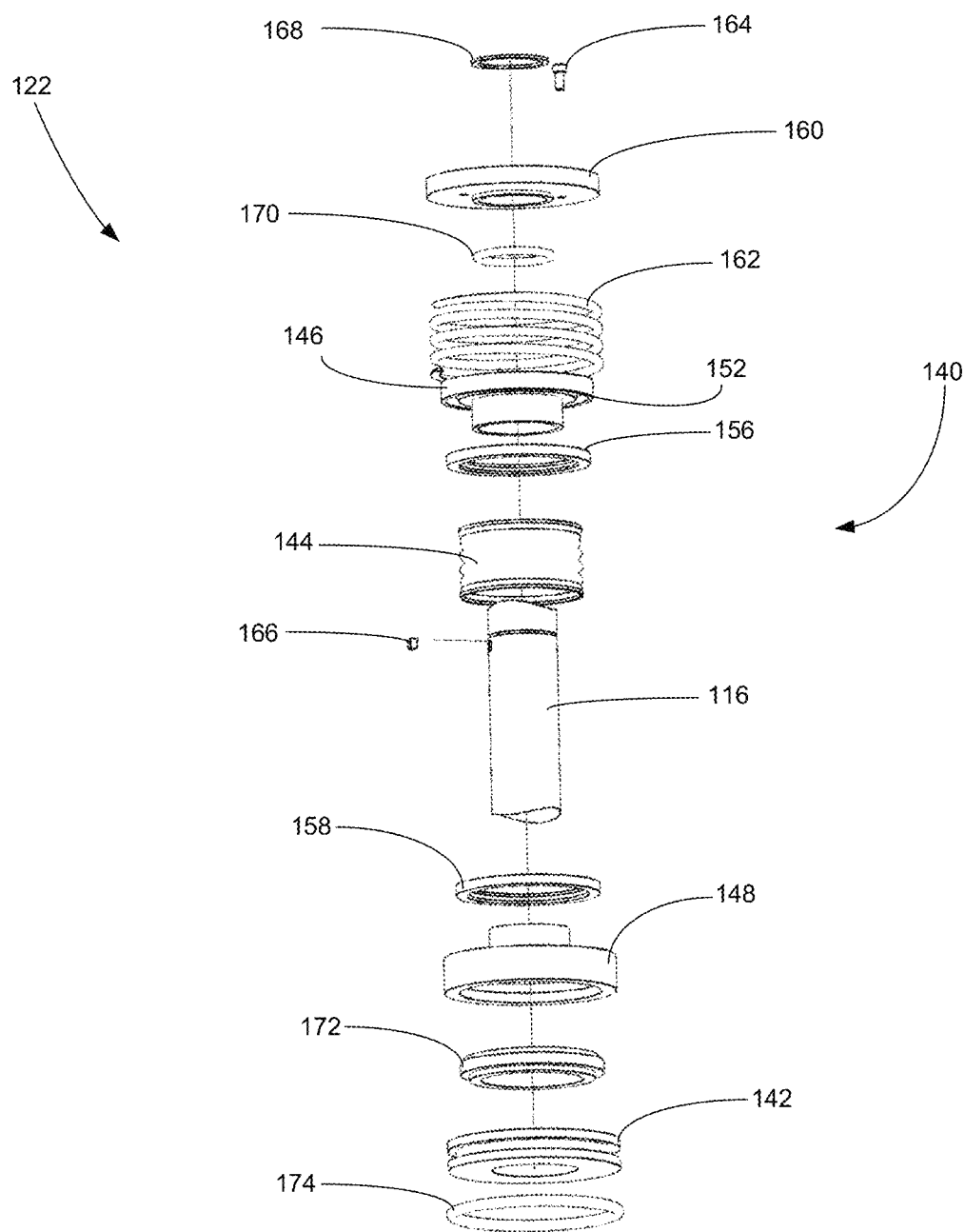
FIG. 4 is a front exploded view of a first preferred embodiment of a mechanical seal for use with the submersible pumping system of FIG. 2.
Figure 5:
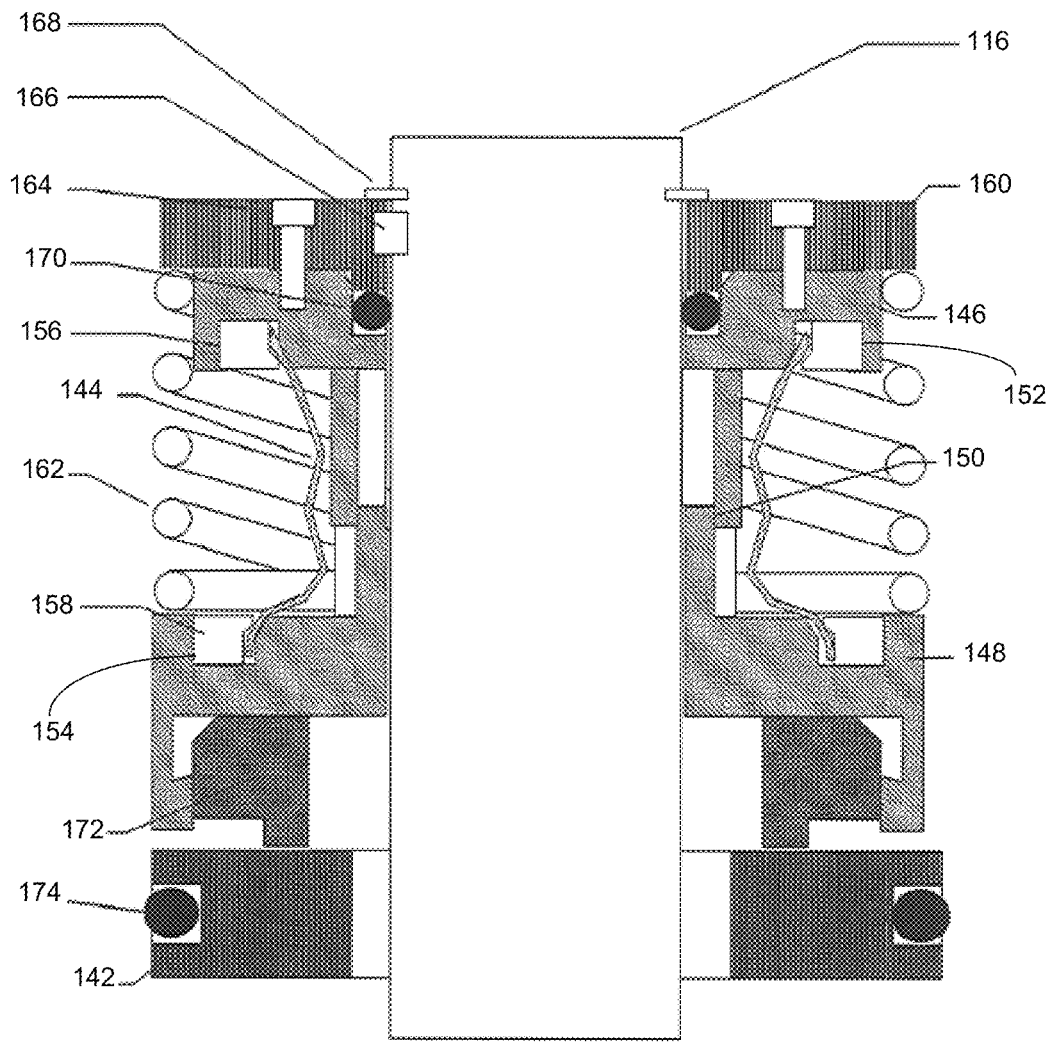
FIG. 5 is a cross-sectional view of the first preferred embodiment of the mechanical seal of FIG. 4.

Turning now to FIGS. 4 and 5, shown therein are an exploded perspective view and cross-sectional view, respectively, of a mechanical seal 122 constructed in accordance with a first preferred embodiment. Like the PRIOR ART seal depicted in FIG. 1, the mechanical seal 122 includes a rotating assembly 140 secured to the shaft 116 and a stationary face 142 that remains fixed relative to the shaft 116. The rotating assembly 140 is spring-loaded and configured to axially expand and contract to stay in contact with the stationary face 142 in the event the shaft 116 is axially displaced.

Unlike the PRIOR ART mechanical seal, the mechanical seal 122 includes a polymer-based bellows 144 that is capable of withstanding higher temperatures and is more cost effective to manufacture than traditional elastomer or metal bellows. The bellows 144 is preferably constructed from perfluoroalkoxy (PFA). Alternatively, the bellows 144 can be constructed from polytetrafluoroethylene (PTFE), fluoroelastomers, perfluoroelastomers, polyether ether ketone (PEEK), metalized PFA, or metalized PTFE. Suitable fluoroelastomers are commercially available under the AFLAS and VITON brands. The bellows 144 can be manufactured using extrusion, molding or welding processes. In a particularly preferred embodiment, the bellows 144 is made from extruded perfluoroalkoxy (PFA). The extruded PFA bellows 144 is seamless, flexible and provides an impermeable membrane that is capable of withstanding the aggravated temperatures of modern applications. The bellows 144 preferably includes one or more folds that allow the bellows 144 to stretch or compress as the rotating assembly 140 moves with the shaft 116.

Continuing with the first preferred embodiment of FIGS. 4 and 5, the rotating assembly 140 further includes an upper bellows ring 146 and a lower bellows ring 148. As best depicted in FIG. 5, the upper bellows ring 146 and lower bellows ring 148 each include mating projections 150 which allow the upper bellows ring 146 to interlock with the lower bellows ring 148 in a sliding key arrangement. This arrangement allows the upper and lower bellows rings 146, 148 to slide axially relative to one another while causing the upper and lower bellows rings 146, 148 to be registered together for rotation.

The bellows 144 extends between the upper bellows ring 146 and lower bellows ring 148. The upper bellows ring 146 includes an upper crimp ring recess 152 and the lower bellows ring 148 includes lower crimp ring recess 154. The bellows 144 is securely captured within the upper bellows recess and lower bellows recess 152, 154 by upper and lower crimp rings 156, 158.

A presently preferred method of assembly includes the process of placing the upper and lower crimp rings 156, 158 around the bellows 144. One of the open ends of the bellows 144 is then placed in the lower crimp ring recess 154. The lower crimp rings 158 is then pressed into the lower crimp ring recess 154 to create a press-fit engagement that captures the open end of the bellows 144 within the lower bellows ring 148. The upper bellows ring 146 can then be placed into registry with the lower bellows ring 148. The free end of the bellows 144 can then be located within the upper crimp ring recess 152 and secured with the upper crimp ring 156. The upper crimp ring 156 can be pressed into the upper crimp ring recess 152 to securely capture the free end of the bellows 144. In this way, the uniquely shaped bellows 144 can be efficiently secured to the upper and lower bellows rings 146, 148 to create an effective seal between the upper and lower bellows rings 146, 148.

Continuing with the mechanical seal 122, the rotating assembly 140 includes a drive ring 160 above the upper bellows ring 146 and a spring 162 captured between the drive ring 160 and the lower bellows ring. In the presently preferred embodiment, the spring 162 is placed around the outside of the upper bellows ring 146 and below the drive ring 160. The drive ring 160 is secured to the upper bellows ring 146 with one or more cap screws 164 that are preferably installed flush with the upper surface of the drive ring 160. The drive ring 160 is secured to the shaft 116, preferably with a drive ring key 166 positioned within a receiving notch or slot in the shaft 116. The drive ring key 166 causes the drive ring 160 and the balance of the rotating assembly 140 to rotate with the shaft 116. A snap ring 168 holds the entire rotating assembly 140 in a fixed longitudinal position along the shaft 116. In the preferred embodiment depicted in FIG. 5, the rotating assembly 140 includes a drive ring o-ring seal 170 disposed between the drive ring 160 and upper bellows ring 146.

At the bottom of the rotating assembly 140, the mechanical seal 122 includes a runner 172. The runner 172 resides within the lower bellows ring 148 and is pressed by the lower bellows ring 148 against the stationary face 142. The stationary face 142 preferably includes a stationary face o-ring seal 174 that prohibits the movement of fluid around the outer diameter of the stationary face. The inner diameter of the stationary face 142 is preferably slightly larger than the outer diameter of the shaft 116 to permit the free rotation of the shaft 116 within the stationary face 142. The passage of fluid under the stationary face 142 is blocked by the contact between the rotation assembly 140 and the stationary face 142.

The runner 172 and the stationary face 142 are preferably constructed of a durable material, such as tungsten carbide, silicon carbide or suitable ceramic. These materials are preferred due to their resistance to the abrasion caused by sand or other particulate matter frequently present in wellbore fluid that can wear components of the mechanical seal 122, although other resistant materials are also suitable. Although the runner 172 and lower bellows ring 148 are depicted as separate components, in an alternate embodiment, the runner 172 and lower bellows ring 148 are constructed from a unitary piece of tungsten carbide, silicon carbide, ceramic or other suitable material.

When installed, the mechanical seal 122 is preferably "pre-loaded" by compressing the spring 162 to a desired extent and locking the mechanical seal 122 into position with the snap ring 168. Shims can be placed between the snap ring 168 and the drive ring 160 to adjust the extent of compression. Preloading the mechanical seal 122 enables the runner 172 to remain in contact with the stationary face 142 in the event the shaft 116 experiences axial displacement.

Figure 6:
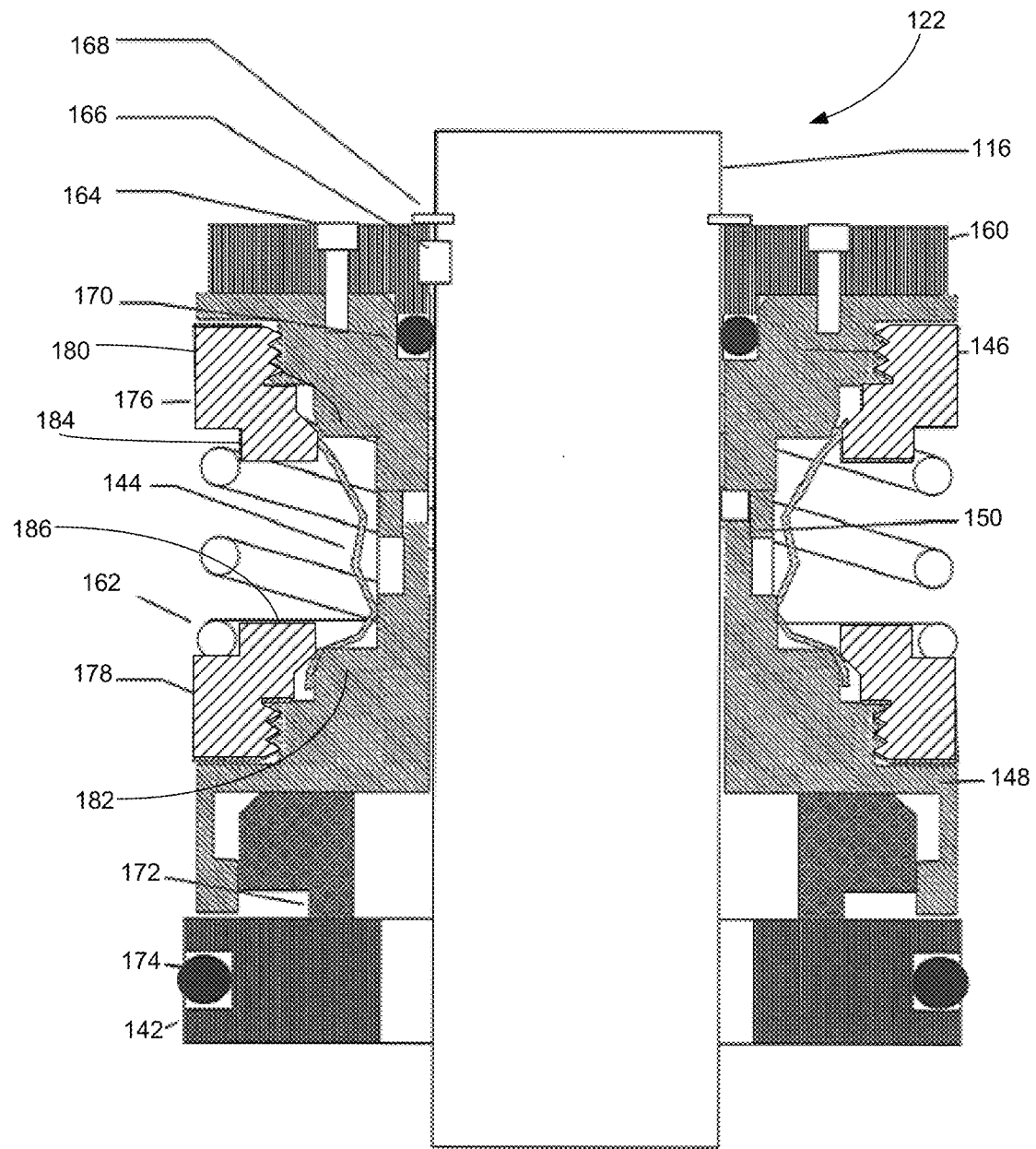
FIG. 6 is a cross-sectional view of a second preferred embodiment of the mechanical seal.

Turning to FIG. 6, shown therein is a second preferred embodiment of the mechanical seal 122. In the second preferred embodiment depicted in FIG. 6, the bellows 144 are held in place on the upper bellows ring 146 and lower bellows ring 148 by upper and lower locking rings 176, 178. The upper bellows ring 146 includes an upper contact flange 180 and the lower bellows ring 148 includes a lower contact flange 182. The upper locking ring 176 includes an upper contact shoulder 184 and the lower contact ring 178 includes a lower contact shoulder 186.

In a particularly preferred embodiment, the upper and lower locking rings 176, 178 are configured to be threadingly engaged on the upper and lower bellows rings 146, 148, respectively. As the upper locking ring 176 is threaded onto the upper bellows ring 146, the upper contact shoulder 184 of the upper locking ring 176 presses the bellows 144 against the upper contact flange 180. Similarly, as the lower locking ring 178 is threaded onto the lower bellows ring 148, the lower contact shoulder 186 presses the bellows 144 against the lower contact flange 182. In this way, the upper and lower locking rings 176, 178 cooperate with the upper and lower contact flanges 180, 182, respectively, to create an interference fit around the bellows 144.

Figure 7:
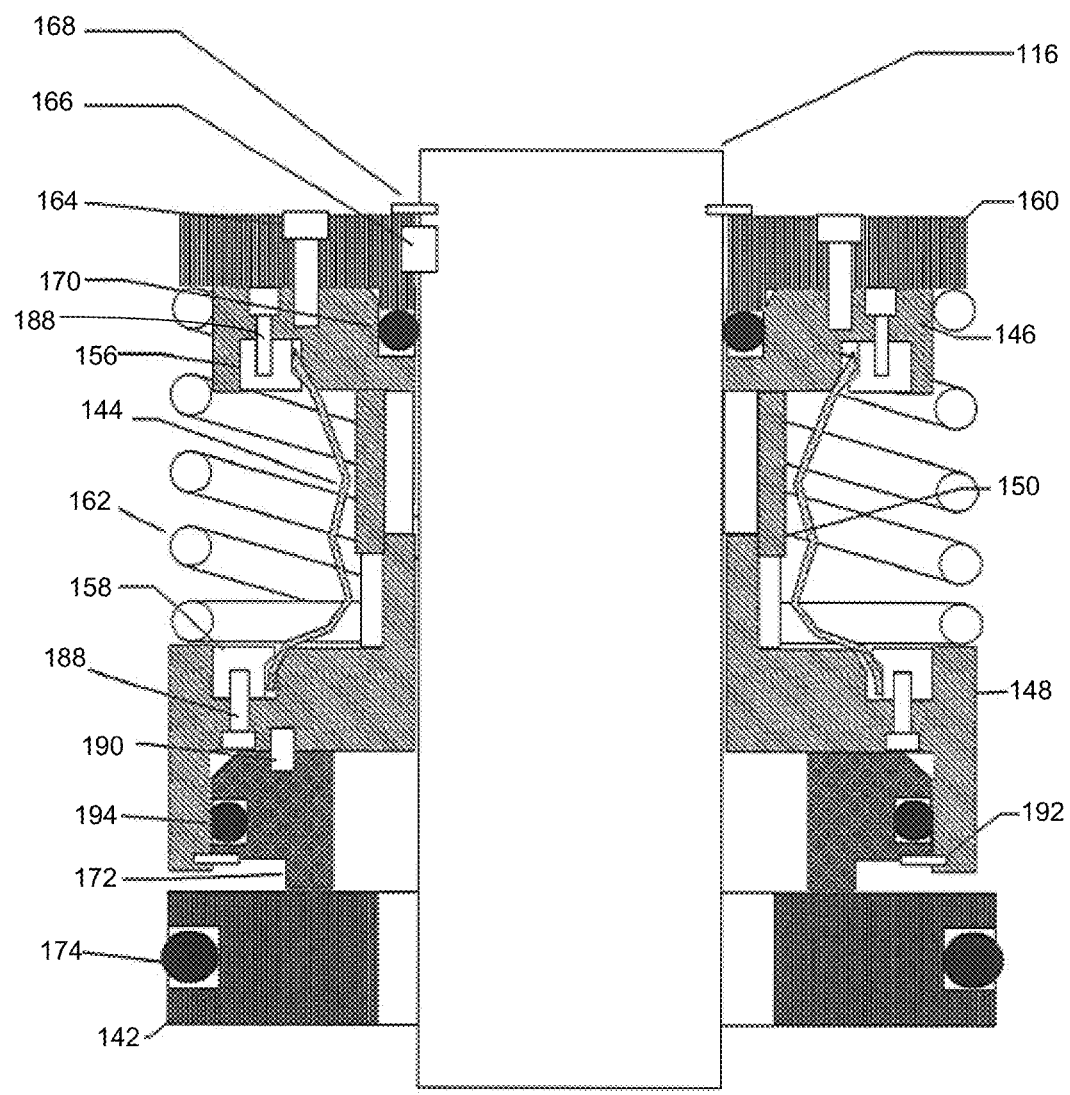
FIG. 7 is a cross-sectional view of a third preferred embodiment of the mechanical seal.

Turning to FIG. 7, shown therein is a third preferred embodiment of the mechanical seal 122. Like the first preferred embodiment depicted in FIGS. 4 and 5, the third preferred embodiment includes upper and lower crimp rings 156, 158. However, the upper and lower crimp rings 156, 158 are held in place within the upper and lower bellows rings 146, 148 with crimp ring screws 188. The crimp ring screws 188 are preferably flush with the outside surface of the upper and lower bellows rings 146, 148. The use of the crimp ring screws 188 allows the upper and lower crimp rings 156, 158 to be tightly drawn in to the upper and lower bellows rings 146, 148.

The third preferred embodiment also includes a runner locking key 190 between the runner 172 and the lower bellows ring 148. The runner locking key 190 ensures that the runner 172 rotates together with the lower bellows ring 148 and the balance of the rotating assembly 140. The runner locking key 190 prevents the runner 172 from "stalling" and remaining in a stationary position relative to the stationary face 142. The rotating assembly 140 also includes a runner snap ring 192 that locks the runner 172 into axial relationship with the lower bellows ring 148. The runner snap ring 192 prevents the runner 172 from separating from the lower bellows ring 148. Lastly, the rotating assembly 140 includes a runner o-ring seal 194 disposed between the runner 172 and the lower bellows ring 148. The runner o-ring seal 194 prevents the migration of fluid between the outside of the runner 172 and the lower bellows ring 148.

Although the various elements of the mechanical seal 122 have been described as upper and lower to identify the relative positions of these elements within the mechanical seal 122, it will be appreciated the mechanical seal 122 may be installed in any direction or orientation. Furthermore, it will be understood that the mechanical seal 122 can be used within any component that employs a rotating shaft wherein the prevention of fluid flow is desired. Thus, in addition to the seal section 112, the mechanical seal 122 may be used in motors, pumps and gearboxes.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A mechanical seal comprising:
    a stationary face; and
    a rotating assembly adjacent to the stationary face, wherein the rotating assembly includes:
        an upper bellows ring, wherein the upper bellows ring includes an upper crimp ring recess and an upper crimp ring;
        a lower bellows ring;
        a bellows extending between the upper bellows ring and the lower bellows ring, wherein the bellows comprises a polymer tube;
        a runner between the lower bellows ring and the stationary face; and
        wherein the placement of the bellows and upper crimp ring into the upper crimp ring recess captures the bellows within the upper bellows ring.

2. The mechanical seal of claim 1, wherein the upper bellows ring further comprises one or more crimp ring screws that are configured to draw the upper crimp ring into the upper crimp ring recess.

3. The mechanical seal of claim 2, wherein the bellows is a seamless tube that has been extruded from perfluoroalkoxy polymer.

4. The mechanical seal of claim 1, wherein the upper crimp ring is configured for a press fit engagement with the upper crimp ring recess.

5. The mechanical seal of claim 1, wherein the bellows comprises a perfluoroalkoxy (PFA) polymer tube.

6. The mechanical seal of claim 1, further comprising:
    a drive ring connected to the upper bellows ring; and
    a spring extending between the drive ring and the lower bellows ring.

7. The mechanical seal of claim 1, further comprising:
    a runner locking key disposed between the runner and the lower bellows ring to fix the runner and the lower bellows ring in rotational alignment; and
    a runner snap ring disposed between the runner and the lower bellows ring to fix the runner and the lower bellows ring in axial alignment.

8. A mechanical seal comprising:
    a stationary face; and
    a rotating assembly adjacent to the stationary face, wherein the rotating assembly includes:
        an upper bellows ring;
        a lower bellows ring, wherein the lower bellows ring includes a lower crimp ring recess and a lower crimp ring;
        a bellows extending between the upper bellows ring and the lower bellows ring, wherein the bellows comprises a polymer tube;
        a runner between the lower bellows ring and the stationary face; and
        wherein the placement of the bellows and lower crimp ring into the lower crimp ring recess captures the bellows within the lower bellows ring.

9. The mechanical seal of claim 8, wherein the lower bellows ring further comprises one or more crimp ring screws that are configured to draw the lower crimp ring into the lower crimp ring recess.

10. The mechanical seal of claim 9, wherein the bellows is a seamless tube that has been extruded from perfluoroalkoxy polymer.

11. The mechanical seal of claim 8, wherein the lower crimp ring is configured for a press fit engagement with the lower crimp ring recess.

12. The mechanical seal of claim 8, wherein the bellows comprises a perfluoroalkoxy (PFA) polymer tube.

13. The mechanical seal of claim 8, further comprising:
a drive ring connected to the upper bellows ring; and
a spring extending between the drive ring and the lower bellows ring.

14. The mechanical seal of claim 8, further comprising:
a runner locking key disposed between the runner and the lower bellows ring to fix the runner and the lower bellows ring in rotational alignment; and
a runner snap ring disposed between the runner and the lower bellows ring to fix the runner and the lower bellows ring in axial alignment.

15. A pumping system comprising:
a motor assembly;
a pump assembly driven by the motor assembly; and
a seal section positioned between the pump assembly and the motor assembly,
wherein the seal section includes a mechanical seal comprising:
a stationary face; and
a rotating assembly adjacent to the stationary face, wherein the rotating assembly includes:
an upper bellows ring, wherein the upper bellows ring includes a locking mechanism selected from the group consisting of (i) a crimp ring configured for a press fit engagement within the upper bellows ring; (ii) a crimp ring configured for to be drawn into the upper bellows ring with a crimp ring screw; and (iii) a locking ring configured for threaded engagement with the upper bellows ring;
a lower bellows ring, wherein the lower bellows ring includes a locking mechanism selected from the group consisting of (i) a crimp ring configured for a press fit engagement within the lower bellows ring; (ii) a crimp ring configured for to be drawn into the lower bellows ring with a crimp ring screw; and (iii) a locking ring configured for threaded engagement with the lower bellows ring; and
a bellows extending between the upper bellows ring and the lower bellows ring.

16. The pumping system of claim 15, wherein the mechanical seal further comprises a runner between the lower bellows ring and the stationary face.

17. The pumping system of claim 15, wherein the bellows comprises a perfluoroalkoxy (PFA) polymer tube.

18. The pumping system of claim 17, wherein the bellows is a seamless tube that has been extruded from perfluoroalkoxy polymer.

19. The pumping system of claim 15, wherein the mechanical seal further comprises:
a drive ring connected to the upper bellows ring; and
a spring extending between the drive ring and the lower bellows ring.

20. The pumping system of claim 15, wherein the mechanical seal further comprises:
a runner locking key disposed between the runner and the lower bellows ring to fix the runner and the lower bellows ring in rotational alignment; and
a runner snap ring disposed between the runner and the lower bellows ring to fix the runner and the lower bellows ring in axial alignment.

\* \* \* \* \*